United States Patent

Schmitt

[15] 3,702,088
[45] Nov. 7, 1972

[54] DOUBLE SHANK BLIND BOLT
[72] Inventor: Hubert A. Schmitt, Auburn, Wash.
[73] Assignee: The Boeing Company, Seattle, Wash.
[22] Filed: March 31, 1971
[21] Appl. No.: 129,775

[52] U.S. Cl. .................................................. 85/77
[51] Int. Cl. ............................................. F16b 10/19
[58] Field of Search........85/77, 78, 72, 70, 4, 82, 83, 85/73, 74; 287/189.36 F

[56] References Cited

UNITED STATES PATENTS

| | | | |
|---|---|---|---|
| 2,384,321 | 9/1945 | Lees | 85/78 |
| 2,538,623 | 1/1951 | Keating | 85/78 |
| 3,065,661 | 11/1962 | Kolec et al. | 85/72 |
| 3,271,058 | 9/1966 | Anderson | 85/4 |
| 3,276,308 | 10/1966 | Bergere | 85/77 |
| 3,286,580 | 11/1966 | Jeal | 85/77 |
| 3,369,442 | 2/1968 | Darby et al. | 85/70 |

FOREIGN PATENTS OR APPLICATIONS

| | | | |
|---|---|---|---|
| 596,275 | 12/1947 | Great Britain | 85/78 |
| 602,652 | 5/1948 | Great Britain | 85/77 |

Primary Examiner—Marion Parsons, Jr.
Attorney—Glenn Orlob, Kenneth W. Thomas and Bernard A. Donahue

[57] ABSTRACT

A high strength blind bolt type radially expanding fastening system which may be completely installed from one side of the joint comprising an external 70° flush head sleeve member, and an internal conical pin member having a serrated surface with a break-off groove. The sleeve member is provided with a matching smooth conical inner wall having a taper of approximately 0.020 inch per inch and of correspondingly smaller diameter than that of the pin member. The oversized pin is inserted into the sleeve and the fastener assembly placed into a close tolerance hole from the flush side of the joint. Pulling and holding forces are applied to the pin and sleeve members respectively, and the pin is drawn into the sleeve; a serrated lead-in surface located ahead of the break-off groove acting to react a portion of the load required to expand the sleeve until the serrated lead-in surface and the break-off groove emerge from the flush end of the sleeve. The break-off groove is designed to fracture at a predetermined load sufficient to have expanded the sleeve approximately 0.005 inches thereby causing the serration notches to lockingly engage the smooth inner wall of the sleeve to secure the joint.

1 Claim, 4 Drawing Figures

PATENTED NOV 7 1972            3,702,088

INVENTOR,
HUBERT A. SCHMITT
BY
Bernard A. Donahue
ATTORNEY

DOUBLE SHANK BLIND BOLT

BACKGROUND OF THE INVENTION

1. Field of The Invention

This invention relates to a high strength blind bolt for aircraft structures which is internally locking and does not require external holding means such as a threaded nut to withstand loads encountered in an aircraft vibration and fatigue environment. The fastener is radially expanding under the action of matched conical surfaces, one of which is provided with serration notches, to create an interference fit hoop-tension preload of the outer sleeve of the fastener and also of the material surrounding the hole for improved fatigue life.

2. Description of The Prior Art

In the past, many varieties of blind bolts and rivets which may be completely installed from one side of the joint have been developed to satisfy a requirement for such fasteners in aircraft structural locations having limited access for installation of fasteners. However, such blind fasteners have been assigned relatively low static strength allowables and are notoriously unreliable under vibration conditions and sustained cyclic flight loadings.

Recent emphasis on an increased fatigue life for airframes has led to the use of nut and bolt installations wherein the shank of the bolt creates an interference fit with the hole to prestress the surrounding material to reduce the mean overall stress level for the prevention of fatigue cracks. Such interference fit installations have generally been limited to threaded fastening systems wherein access may be had to both sides of the joint. Two-piece expandable sleeve assemblies, such as shown in U.S. Pat. 3,271,058 to Anderson, can be used to obtain some degree of preload around the hole but require access from both sides of the joint for installation and, as is pointed out in the Anderson patent, require a threaded bolt-to-nut connection or other external holding means because of their tendency to loosen under vibration loadings.

It is an object of this invention to provide a blind fastener system which may be completely installed from one side of the joint, which expands to prestress the material surrounding the hole for increased fatigue life, and which has static and vibration strength allowables approaching those of a conventional high strength threaded bolt and nut combination.

A related object of this invention is to provide a two-part flush head blind fastener assembly which utilizes one-way serration notches acting against a smooth conical surface to provide an adjustable grip length and a locking interengagement of the two parts of the fastener system within the hole.

A further related object of this invention is to provide, in a fastener of the class described serration notches acting ahead of a break-off groove to react a portion of the load required for installing the fastener to reduce the load acting on the break-off groove during installation.

Other and further objects and advantages of this invention will become apparent in the discussion and description which follows.

SUMMARY

The objectives of this invention have been achieved by a two-part radially expanding double shank fastener assembly which in the preferred embodiment comprises a 70° flush head sleeve member with a smooth inner wall tapered at 0.020 inch per inch, and a matching conical draw pin member of correspondingly larger diameters by approximately 0.005 inches. The pin member has a serrated surface which lockingly interengages with the smooth inner wall of the sleeve upon final installation. A break-off groove is located on the pin along the serrated surface so that several lead-in serrations precede the groove to reduce the installation tensile load acting on the groove to minimize premature break-off problems of the prior art. When the fastener assembly is initially inserted in a hole from the flush side of the joint, the protrusion on the opposite side of the joint is of the order of the diameter of the fastener, a significant improvement over prior art blind fasteners which have a protrusion approximating the grip length of the fastener. When installed in a close tolerance hole, the assembly will radially expand to create a predetermined residual hoop tension stress in the material surrounding the hole to improve the fatigue life of the joint.

DESCRIPTION OF PREFERRED EMBODIMENTS

Figure 1:
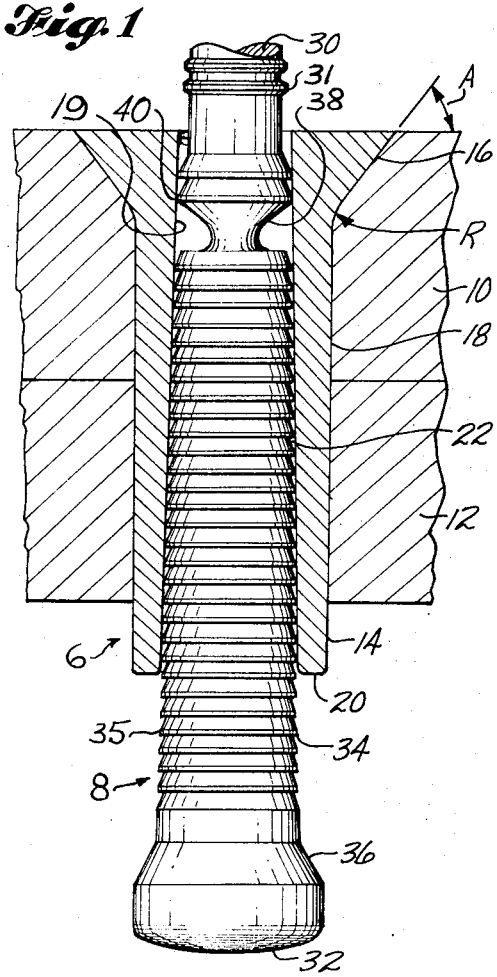
FIG. 1 depicts a bolt assembly of this invention after insertion from the flush side of the joint and prior to the application of installation forces on the draw pin.

FIG. 1 is a cross-sectional view showing a blind bolt assembly of this invention wherein an external sleeve member 6 and an internal pin member 8 have been inserted into a close tolerance hole passing through structural members 10 and 12, from the upper or flush side of the joint. External sleeve member 6 comprises an annular extending end portion 14, a flush head-end portion 16 having an included cone angle ranging from 60° to 85° and preferably 70°, and a central annular shank portion 18. The radius R is preferably greater than 0.03 inches as an enlarged radius has been found to assist in the smooth deformation of material around the hole upon expansion of the sleeve member. The sleeve 6 is provided with a smooth inner wall 19 having a taper of approximately 0.020 inch per inch along its entire length.

The internal pin member 8 is preferably constructed of a material somewhat harder than that of sleeve 6, and includes a draw portion 30 provided with a series of grip rings 31, for engagement with a draw pin pulling device of a type known in the art. A protruding head-end 32 has a swaging surface 36, preferably disposed at an included cone angle of less than 90°, and integrally connected to a conical shank portion 34 having a surface with series of serration notches 35 formed therein.

The conical shank portion 34 has a taper to match that of the inner surface of the sleeve and correspondingly larger diameters by approximately 0.005 inches. A break-off groove 38 is designed to fracture at a predetermined tensile load sufficient to radially expand and swage the sleeve into its final installed position. A pair of serration notches 40 are located ahead of the break-off groove and serve to take a portion of the load which would otherwise pass through groove 38 during initial relative movement of the pin 8 in expanding the sleeve 6. This expedient has been found to minimize premature break-off problems.

From FIG. 1 it can be noted that the total initial protrusion of the fastener assembly is approximately the same as the diameter of the fastener, an improvement over many blind fasteners requiring substantially more protrusion clearance. Using the taper and geometries discussed above the total travel of the pin 8 need be no more than approximately one-fourth inch to achieve the desired degree of expansion of the sleeve member 6. The total travel distance involved here has been deliberately shortened to eliminate bending, sleeve stretching and galling problems associated with certain prior art blind fasteners.

Figure 2:
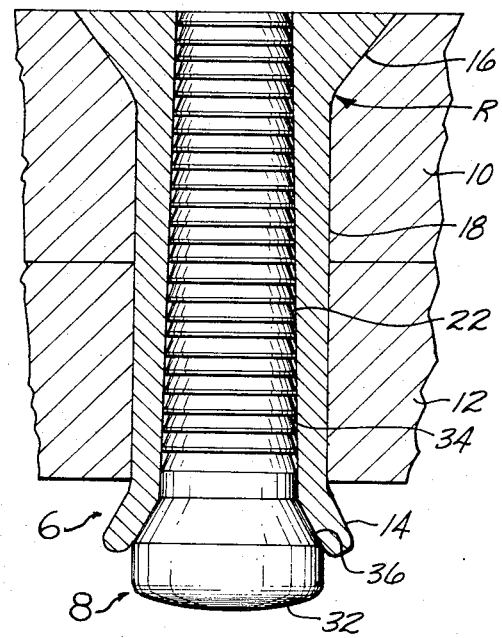
FIG. 2 shows the bolt assembly of FIG. 1 completely installed in the hole after application of installation forces.

FIG. 2 shows the completed installation after application of pulling forces to the draw pin member 8 which expand the sleeve by contact between the enlarged serration surface of the pin and the smooth inner wall 19 of the sleeve member 6, and swage the extending annular portion 14 of the sleeve through contact with swaging surface 36 of the pin. In the development of this invention it was found that the one-way locking serrations acting against a matching undersized smooth conical surface plus the swage action on the blind side of the joint will allow the assembly to be installed with relatively low-level pulling forces while assuring a positive interlock to secure the joint under vibration loads, and static structural loads approaching those normally associated with high strength threaded fasteners. When fully installed as shown in FIG. 2, a desired degree of radial expansion, such as the 0.005 inches discussed earlier, will have been achieved and the material surrounding the hole will have been prestressed with tensile hoop-tension loads which will substantially improve the fatigue life of the joint.

Figure 3:
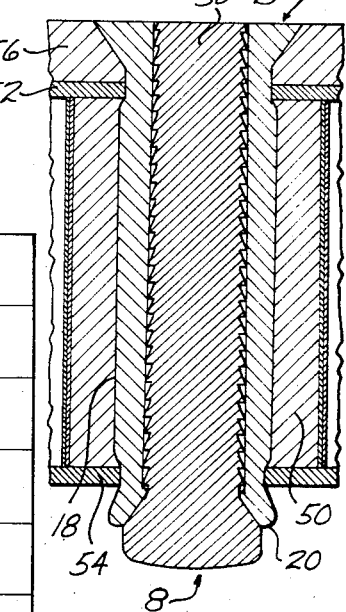
FIG. 3 shows the bolt assembly installed in a sandwich panel structure and illustrates the manner in which the panel face sheets are rigidly gripped by the swelling of the sleeve member.

FIG. 3. shows the bolt of this invention installed in a honeycomb sandwich panel, in which its economic and improved strength advantages have been found to be significant over prior art fastening systems, many of which require separate load transfer spools embedded in the panel prior installation of a fastener. The fastener of this invention expands in the manner illustrated to grip each of the panel face sheets and give very good strength, vibration and fatigue properties without the necessity of elaborate pretreatment of the hole structure. The sandwich panel honeycomb core 50 is attached to face sheets 52 and 54 and joined to structural member 56 by a fastener assembly of the type shown in FIGS. 1 and 2. As the draw pin 8 is pulled into the installed position shown, the central shank portion 18 of external sleeve member 6 expands radially into the soft edged core webs while being restrained by the relatively rigid face sheets 52 and 54. This action, together with the swaging of end portion 14, serves to trap and hold the face sheets for load transfer purposes as well as to prestress the face sheet material around the hole to prevent fatigue cracks. Therefore, the installation offers a structurally sound joint which requires only the drilling of a close tolerance hole through the sandwich panel, and eliminates elaborate hole pretreatment, as, for example, the placement of a spool surrounded by potting compound in contact with the web and face sheets.

Figure 4:
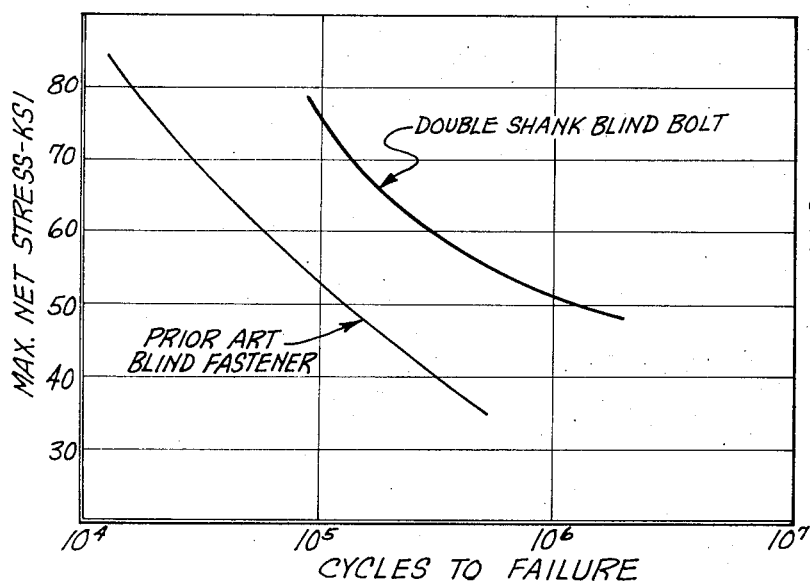
FIG. 4 is a plot which compares fatigue test data obtained from a prior art blind fastener in widespread use today, with test data obtained from the blind bolt of this invention.

FIG. 4 presents a plot of fatigue data obtained using conventional prior art blind fasteners of a type in widespread use today, and a plot of similar data obtained with the fastener herein disclosed. The tests were performed on identical standard dog-bone no-load transfer type tensile specimens. The ordinate represents tensile stress levels on the net specimen area surrounding the hole. The abscissa is in terms of cycles to failure plotted on a logrithmic scale. The improvement shown by these plots is striking. For example, note that at the 50,000 psi stress level, in the range critical for titanium airframe structures, the improvement is from approximately 120,000 cycles to over 1,000,000 cycles. Accordingly, the disclosed fastener system represents a significant advance in the aircraft fastener art in terms of fatigue strength improvement as well as the advantages previously discussed.

The invention has been described and illustrated in detail using preferred dimensioning and embodiments developed to date. While most of the specimens tested have been designed to obtain a diametrical interference of 0.005 inches for preload purposes, the basic concepts have been demonstrated to be applicable to interferences ranging from 0.001 to 0.012 inches, the optimum amount of interference to be selected as a function of the specific joint parameters under consideration, such as material properties, fastener size, load transfer ratio and joint configuration. Variations and modifications will occur to persons skilled in this art without departing from the spirit and scope of the invention. Accordingly, it is intended in the appended claims to cover all such variations and modifications.

What is claimed and desired to be secured by U.S. Letters Patent is:

1. A blind fastener system which may be installed from one side of a structural joint comprising in combination: an external sleeve and an internal pin arranged to lockingly interengage within a hole passing through said joint; wherein said sleeve is provided with a conical smooth inner wall tapering uniformly from a minimum diameter at the end of the sleeve nearest the side of the joint from which the fastener is to be installed, to a maximum diameter at the other end of said sleeve; and, wherein said internal pin is provided with a conically shaped shank tapered to match the taper of said inner wall, said shank including a serrated section having a plurality of surface notches for engagement with the smooth inner wall of said sleeve, the diameters of said shank being greater than the corresponding diameters of said inner wall by an amount such that when said fastener system is fully installed in said joint, said pin member will force said external member to expand radially outwardly to a prestressed condition and said serrated section surface notches will lockingly engage the smooth wall of said sleeve to prevent disassembly of said fastener system; wherein said internal pin is provided with a protruding head-end portion having a conical swaging surface with an included cone angle of less than 90° adapted to engage and swage outwardly an end portion of said sleeve, and said pin is also provided with a break-off groove of substantially reduced cross-sectional area such that at a predetermined installation load sufficient to fully install said fastener, said break-off groove will fracture to disengage the means used to install the fastener; wherein said pin is provided with at least one serration notch ahead of said break-off groove to reduce the initial installation forces passing through said break-off groove region; wherein said smooth inner wall is tapered substantially .020 inch per inch along its length; wherein said sleeve has a flush conical head with an included cone angle ranging from 60° to 85° adapted to seat in a countersink in the face of the joint on the side from which the fastener is installed; wherein said sleeve has a radiused surface having a minimum radius of curvature of 0.03 inches contiguous with the surface of said conical head; and wherein when said fastener system is fully installed in said hole, the exterior shape of said sleeve has been diametrically expanded to cause an interference fit with the walls of said hole ranging from 0.001 to 0.012 inches to generate hoop tension stresses in the surrounding material for the purpose of increasing the effective fatigue life of the joint.

* * * * *